May 12, 1953     J. W. TRISCHKA ET AL     2,638,493
INTEGRATING CIRCUIT

Filed July 29, 1946     2 Sheets-Sheet 2

INVENTORS
HENRI S. SACK
JOHN W. TRISCHKA

BY *M. O. Hayes*
ATTORNEY

Patented May 12, 1953

2,638,493

UNITED STATES PATENT OFFICE 2,638,493

INTEGRATING CIRCUIT

John W. Trischka, New York, and Henri S. Sack, Ithaca, N. Y., assignors to the United States of America as represented by the Secretary of the Navy Application July 29, 1946, Serial No. 686,968

23 Claims. (Cl. 171—95)

This invention relates in general to a computer for determining a resultant as a function of several variables, and more particularly to an electro-mechanical computer which presents an integrated total of the sum or difference of several variables.

Currents capable of addition or subtraction and integration or differentiation are generally useful in connection with computers used in navigational or range finding radar equipment. A circuit of this type employing a magnetic amplifier which includes transformers operated in the non-linear region is disclosed in patent application entitled "Magnetic Amplifier" Serial No. 679,596, filed June 27, 1946 by B. Rossi, H. S. Sack, R. T. Beyer, and G. Miller.

The present invention contemplates apparatus for adding two direct currents and integrating the sum thus obtained with respect to time, the result being determinable from the angular rotation of a dial.

It is thus an object of this invention to provide a novel computer circuit.

Another object of this invention is to provide non-linear means for combining a plurality of direct currents or voltages and integrating the resultant with respect to time.

A further object of this invention is to provide means for indicating the result of a particular mathematical process by the angular rotation of a dial.

To accomplish the foregoing general objects, and more specific objects which hereinafter appear, this invention resides in the circuit elements and their relation one to another, as are more particularly described in the following specification. The specification is accompanied by drawings in which.

Before proceeding with a description of the invention, the principles of the magnetic amplifier will be discussed briefly to review the main features of the circuit as disclosed in the above-mentioned application. The basis of the circuit is a non-linear transformer, that is a transformer having a core of ferromagnetic material and operated in a non-linear region, usually near saturation, for greater sensitivity and stability. For this purpose the hysteresis loop of the core preferably has a very steep slope. Whenever a pure sine wave is applied to the primary of such a transformer, the potential on the secondary will contain the same frequency and odd harmonics thereof. This is true for any magnitude of the input potential as long as the hysteresis loop is symmetrical with respect to the origin of the axis. If, however, this symmetry is disturbed by superimposing a direct magnetic field upon the alternating field in the core, thus displacing the hysteresis loop parallel to itself, then even harmonics will also appear in the output. The intensity of these even harmonics will be proportional to the superimposed direct magnetic field. This direct magnetic field can be produced by a direct current passing through a separate coil wound on the transformer or several D. C. excited coils which produce a net magnetic field of a definite amount. There will be, in this case, even harmonics in the output and the amplitude of each will be proportional to the D. C. bias current.

Figure 1:
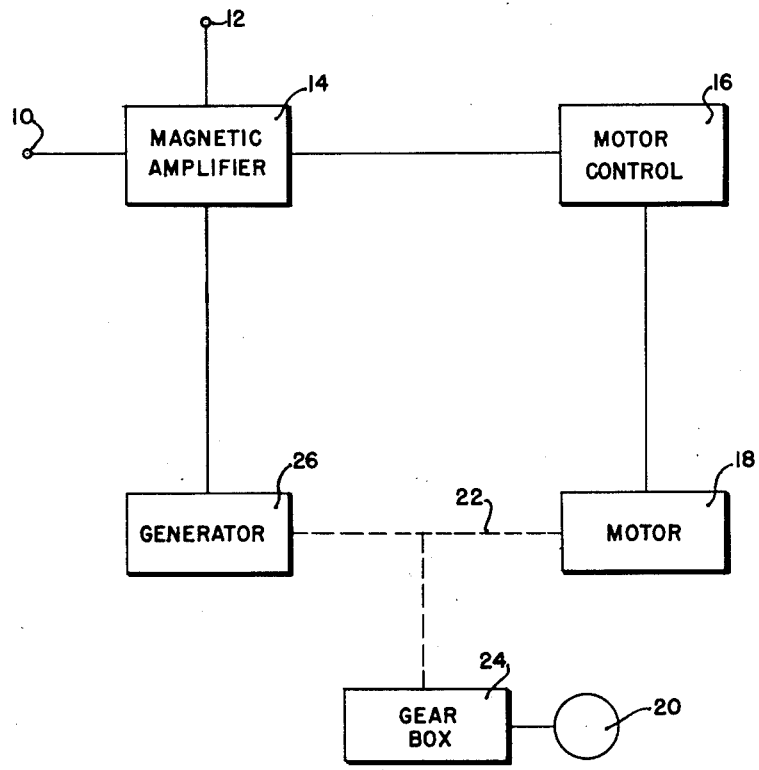
Fig. 1 is a block diagram indicating the main components of this invention.

Referring now to Fig. 1, which shows the invention in block form, a brief description will be given first. Two separate direct currents to be added are applied at points 10 and 12 to a magnetic amplifier 14. The input currents may be applied directly as indicated at points 10 and 12 or may be applied through impedance matching circuits, such as a cathode follower. When such a matching circuit is employed it must have very linear characteristics to insure accuracy of the apparatus.

The two applied direct currents are added by magnetic amplifier 14 in a manner similar to that already described. The magnetic amplifier 14 provides a differential direct current which is proportional to the sum of the input currents. This output is applied to a motor control circuit 16 which in turn drives a motor 18 at a speed proportional to the applied direct currents. Motor 18 drives a dial 20 through a mechanical shaft 22 and reduction gear box 24. The motor 18 rotating at a speed proportional to the input currents will thus drive the dial 20 at a speed proportional to the same input currents and will integrate the output from magnetic amplifier 14. The position of dial 20 at any given time will indicate the integrated sum of the two input currents applied at points 10 and 12.

In addition to driving dial 20 through shaft 22 motor 18 also directly drives a generator 26. The generator speed-voltage characteristics is linear within practical limits. The voltage then developed by generator 26 is proportional to the voltage driving motor 18. The voltage from generator 26 is then applied as a negative feedback to magnetic amplifier 14. This improves the overall stability of the entire device and linearity between the input and output speed is thereby obtained.

Figure 2:
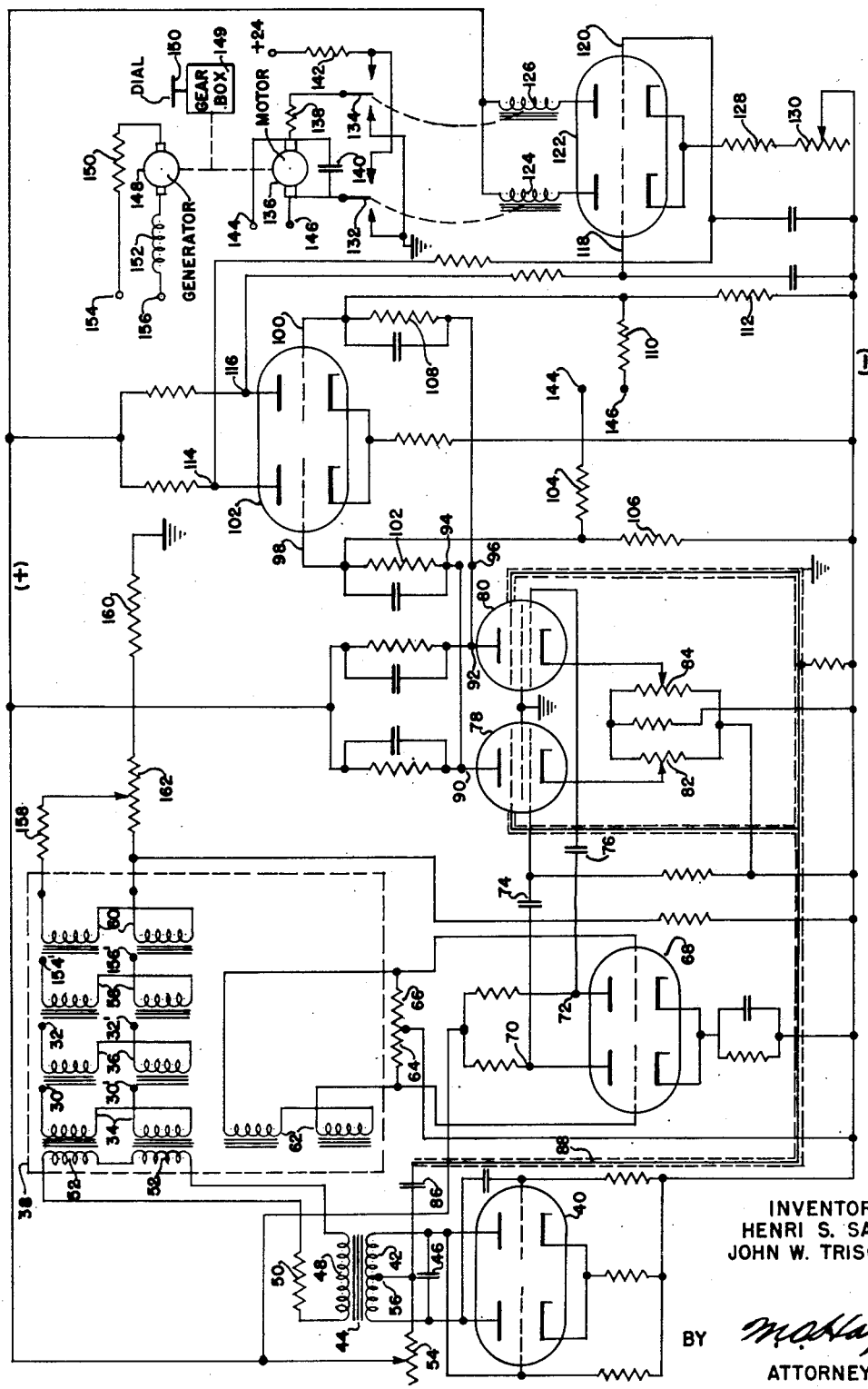
Fig. 2 shows the components of one form of the invention.

The invention will now be described in greater detail with reference to Fig. 2. One of the direct currents to be added is applied to terminals 30, 30' of winding 34 of a non-linear transformer 38. The other direct current to be added is applied to winding 36 at terminals 32, 32'.

Tube 40, a duo-triode, is used to form a conventional balanced negative resistance oscillator with its associated circuit elements. The coil of the tank circuit is one winding 42 of a high Q transformer 44. Capacitor 46 shunted across winding 42 completes the tank circuit. The secondary winding 48 of transformer 44 connects through resistor 50 to the primary windings 52 of non-linear transformer 38. The oscillator applies a substantially pure sine wave to the winding 52. Variable resistance 54 is used to control the amplitude of oscillation of the oscillator. A second harmonic signal is obtained at the center tap 56 of windings 42 on transformer 44. This second harmonic signal is used for modulating purposes to be described later.

As described earlier the direct currents flowing in coils 34 and 36 will shift the hysteresis loop of the transformer 38 which is referred to as non-linear since it is operated beyond a saturation level. The amount of shift introduced will depend on the sum and direction of the currents in the windings 34 and 36, also the currents in windings 58 and 60 which are used for compensation and will be described later. The shift in the hysteresis loop produces a second harmonic of the input frequency from the oscillator the magnitude of which varies with the amount the hysteresis loop is shifted and thus with the sum of the direct currents applied to non-linear transformer 38. This second harmonic is picked up by windings 62 of transformer 38 and is applied across resistors 64 and 66 whose common junction is tied to the negative reference voltage. This resistive load is used in preference to a capacitor which forms a tuned input circuit at the second harmonic frequency. It has the advantage of making the change in sensitivity of the magnetic transformers with oscillator frequency and voltage much less than that for a tuned load. The load circuit allows the fundamental from magnetic transformer 38 to be applied through amplifier 68 to the detector circuit, to be discussed later, but since this frequency is discriminated against by the detector, this is not a serious disadvantage. Also, the load circuit shown reduces the sensitivity of the magnetic transformers, but amplifier 68 overcomes this difficulty.

The output from winding 62 is taken as a differential output across resistances 64 and 66 and is applied to the grids of amplifier 68 which builds up the signal to a suitable level. The amplified differential signal is then taken off the plates 70 and 72 of amplifier 68 and coupled through capacitor 74 and 76 to the control grid of pentode tubes 78 and 80 respectively, which are used as a differential detector. The cathode of each tube 78 and 80 ties to a variable tap on resistances 82 and 84 which taps may be adjusted to balance the detector tubes 78 and 80. A second harmonic signal is taken from oscillator 40 at tap 56 of the transformer winding 42. This signal which is essentially free of any fundamental frequency is coupled through capacitor 86 and shielded cable 88 to the suppressor grid of each detector tube 78 and 80. The output signal from winding 62 of magnetic transformer 38 and the second harmonic signal from oscillator 40 are mixed in tubes 78 and 80 to produce a differential compensating current which is taken off at plates 90 and 92. This output is taken off at terminals 94 and 96 from which it is applied to a motor control circuit to be discussed later. This detector circuit is necessarily phase sensitive to allow changes in polarity of the compensation current produced, so that input voltages which change the sign of the magnetic field of transformer 38 and thus change the output signal 180° in phase will be properly represented in the output of the detector. This phase-sensitive detector with possible variations is treated more fully in copending application Serial Number 684,051 filed July 16, 1946, by H. S. Sack and G. H. Miller.

The differential output potential produced at output terminals 94 and 96 is directly related to the sum of two direct currents applied at 30, 30' and 32, 32'. An electric motor driven by this potential will vary in speed proportional to this potential and thus will vary in speed proportional to the sum of the currents applied to magnetic transformer 38. The motor found suitable for use in the present application is a D. C. motor with a permanent magnet field. The speed may be varied only by changing its armature current. The current required at maximum speed is too large for ordinary vacuum tubes so that continuous control by connecting the motor in the tube circuit directly is not possible. A vacuum tube relay control is feasible and this is what has been used in this particular case.

The differential potential is applied from terminals 94 and 96 to grids 98 and 100 of a duo-triode tube 102 which is operated as a differential D. C. amplifier. The resistance networks 192, 194, and 106, and 108, 110, and 112 are used to obtain an appropriate D. C. bias level for grids 98 and 100 respectively of amplifier 102. The differential output from amplifier 102 is taken off at plates 114 and 116 and applied to the grids 118 and 120 of the differential relay control tube 122. Relay armatures 124 and 126 are connected in the plate circuits of tube 122. Tube 122 is biased by resistance 128 and variable resistance 130 to control the operating level of the relays 124 and 126. Relay 124 operates the movable contact 132 and relay 126 operates the movable contact 134. Movable contact 132 is connected to one side of the armature of motor 136, movable contact 134 through resistance 138 to the other side of armature 136, and capacitor 140 is connected across the armature 136. Movable contacts 132 and 134 are connected to ground when in the left position and connect to a positive voltage source, 24 volts in this example, through resistance 142 when in the right position.

The motor speed is changed by causing movable contacts 132 and 134 to vibrate so that a change occurs in the ratio of the times during which the full battery voltage is applied to the motor in the positive and negative directions. This time ratio is controlled by the output of the magnetic amplifier at terminals 94 and 96 as follows. Assume movable contacts 132 and 134 to be in one position. Then the voltage applied to motor 136 is also applied from terminals 144 and 146 to the grids of amplifier 102 at terminals 144' and 146'. This voltage applied to grids 98 and 100 of tube 102 is of such a polarity that the voltage output of amplifier 102, which is applied to grids of control tube 122, produces currents in relay coils 124 and 126 in such a direction as to reverse the position of movable contacts 132 and 134. Thus, whatever the position of contacts 132 and 134, the voltage on the grids 98 and 100 of tube 102 reverses the contacts 132 and 134, and they will vibrate at a frequency determined by the time constant of the circuit, the time constant being primarily dependent on resistance 138 and capacitance 140. The time during which the contacts 132 and 134 are in a given position will be determined by the differential bias on grids 98 and 100 of tube 102, and since this bias is affected differentially by the output of the detector at terminals 94 and 96, the relative times during which the switches are in one position or the other will be determined by this output.

Motor 136 is coupled mechanically to a generator 148 and through a reduction gear box 149 to a rotatable dial 150. Resistor 138 and capacitor 140 provide a filtering action to prevent large transient voltages from appearing across the motor during switching operations, to prevent breakdown of the armature windings. Resistance 142 serves to limit current drawn from the +24 v. source when contacts 132 and 134 are in a shorting position, which occurs during a fraction of the switching time.

The dial 150 is driven by motor 136 at a speed proportional to the input currents to magnetic transformer 38 and over any given period of time its angular position will indicate the integrated sum of the currents applied to the magnetic transformer to be added.

Motor 136 also drives a generator 148 which is essentially of the same structure as the motor except for a modified brush mounting to insure equal voltage output in both directions of rotation. The output voltage of generator 148 is necessarily precisely proportional to generator speed within limits of desired accuracy. The voltage output from generator 148 is taken out through resistance 150 and inductance 152 at terminals 154 and 156. This voltage at terminals 154 and 156 is applied as a negative feedback to terminals 154' and 156' of the windings 58 of magnetic transformer 38. This negative feedback offsets the disadvantages of this system where the range of linearity between the intensity of the second harmonic and the bias current is limited by the characteristics of the transformer 38 which is also affected by other external conditions such as temperature. It also overcomes the disadvantage of any instability in the amplifier. By using generator 148 instead of feeding back the differential direct current at some intermediate point, the whole system is stabilized. If the amplification in the magnetic amplifier is high enough, the compensation current will be proportional to the input bias current of magnetic transformer 38 with high precision. With a feedback system such as disclosed, the system does not require any linear relations in transformer 38 nor a very high stability amplifier to obtain high precision output.

Resistance 150 is a precision resistor to insure that generator current and voltage are precisely linear in their relationship. It is also of such a size that the current level corresponding to the sum of the input currents applied to transformer 38 will be reached in the output of generator 148 near the maximum speed of the generator, but sufficiently below this speed to prevent unstable operation. Choke 152 is used to make the A. C. impedance of the generator circuit large so that the sensitivity of the magnetic transformers will not be impaired.

To further increase the accuracy of the system and eliminate any residual error, windings 60 are provided on transformer 38 for "zero" compensation. This winding is tied to a voltage divider network composed of resistors 158, 160 and variable resistor 162 to produce a compensating current in winding 60 which may be adjusted by resistor 162 to make the speed of motor 136 and generator 148 zero when there are no input currents applied to windings 34 and 36 of magnetic transformer 38. A system of "automatic zero correction" is treated more fully in copending application Serial Number 682,614 filed July 10, 1946, by H. S. Sack and J. W. Trischka, now Patent No. 2,569,135, issued September 25, 1951.

Thus it may be seen from the above description that this invention provides a means for mechanically integrating the sum of two direct currents, which sum has been obtained in a magnetic amplifier. It is believed that the construction and operation as well as the advantages of this improved adder and integrator apparatus will be apparent from the foregoing detailed description thereof. It will also be apparent that while the invention has been shown and described in a preferred form changes may be made in the circuits disclosed without departing from the spirit of the invention as sought to be defined in the following claims.

What is claimed is:

1. Apparatus for adding a plurality of input direct currents comprising, in combination, a saturable transformer energized at a fundamental frequency and operable to produce a second harmonic signal proportional in amplitude to the algebraic sum of said plurality of input direct currents, means for detecting said second harmonic signal to produce a direct current output voltage proportional to the algebraic sum of said plurality of input direct currents, an electric motor, means for driving said electric motor at a speed proportional to said output voltage, and a rotatable element driven by said motor, said motor driven element being operative to produce an indication representative of the integrated sum of said plurality of input direct currents.

2. In combination, means comprising a saturable transformer energized at a fundamental frequency and operable to produce a second harmonic signal proportional in amplitude to the algebraic sum of a plurality of input direct currents, means for detecting said second harmonic signal to produce a direct current output voltage proportional to the sum of said plurality of input direct currents, and an electric motor operative from differentially connected relay means, said relay means being energized by said direct current output and controlling the speed of said motor, and means coupled to said motor for rotating an indicating element to determine and indicate the integrated sum of said plurality of input direct currents.

3. In combination, non-linear transformer means for adding a plurality of input direct currents to produce an output current proportional to the sum of said plurality of input currents, means for amplifying said output current, a motor, relay means energized by said amplified output current for controlling the speed of said motor, means employing a dial rotatably driven by said motor to integrate said output current, means including a generator driven from said motor to produce a feedback current, means for connecting said feedback current to said non-linear transformer to improve the stability of said apparatus, and means for adjusting the zero output of said apparatus.

4. In combination, a magnetic amplifier for producing a differential direct voltage having a magnitude and polarity proportional to the algebraic sum of a plurality of direct currents, a direct current electric motor, means responsive to said differential voltage for periodically energizing said motor, a direct current generator coupled to said motor, and means coupling the output of said generator to said magnetic amplifier for producing a negative feedback current therein.

5. In combination, a magnetic amplifier for producing a differential direct voltage having a magnitude and polarity proportional to the algebraic sum of a plurality of direct currents, a direct current electric motor, means responsive to said differential voltage for periodically energizing said motor, a direct current generator coupled to said motor, means coupling the output of said generator to said magnetic amplifier for producing a negative feedback current therein, and a rotatable element driven by said motor for indicating the integrated sum of said input currents.

6. Apparatus for adding a plurality of direct currents comprising, a magnetic amplifier, means for applying said direct currents to said amplifier, said magnetic amplifier being operable to produce a differential direct voltage having a magnitude and polarity proportional to the algebraic sum of said input currents, an electric motor, means operative in response to said differential direct voltage for controlling the speed and direction of said motor, a rotatable indicating element coupled to said motor arranged to indicate the integrated sum of said plurality of direct currents, a direct current generator having a linear speed-voltage characteristic coupled to said motor and driven thereby, and means coupling the output of said generator to said magnetic amplifier to produce a negative feedback current in said amplifier.

7. In combination, a pair of saturable cores each having a primary winding, a plurality of input windings, an output winding, and a feedback winding, corresponding windings on said cores being connected in series, means for applying an alternating current which partially saturates said cores to said primary windings, means for applying a plurality of direct input currents to said input windings, means connected to said output windings for detecting the signal induced therein to produce a differential direct voltage having a magnitude and polarity proportional to the algebraic sum of said input currents, an electric motor, means periodically energizing said motor in response to said differential voltage to control the speed and direction of said motor, a direct current generator coupled to said motor, and means coupling the output of said generator to said feedback windings.

8. In combination, a pair of saturable cores each having a primary winding, a plurality of input windings, an output winding, and a feedback winding, corresponding windings on said cores being connected in series, means for applying an alternating current which partially saturates said cores to said primary windings, means for applying a plurality of direct input currents to said input windings, means connected to said output windings for detecting the signal induced therein to produce a differential direct voltage having a magnitude and polarity proportional to the algebraic sum of said input currents, an electric motor, means periodically energizing said motor in response to said differential voltage to control the speed and direction of said motor, a direct current generator coupled to said motor, means coupling the output of said generator to said feedback windings, and a rotatable indicating element coupled to said motor arranged to indicate the integrated sum of said plurality of direct currents.

9. In combination, a pair of saturable cores, an oscillator coupled to said cores, a plurality of input circuits coupled to said cores, output and feedback windings coupled to said cores, said cores being operable to produce an alternating signal in said output windings proportional to the algebraic sum of a plurality of direct currents flowing in said input circuits, means coupled to said output windings for detecting said alternating signal to produce a differential direct voltage having a magnitude and polarity proportional to the algebraic sum of said input currents, a direct current motor, a source of direct voltage for said motor, means operative in response to said differential direct voltage for controlling the ratio of the times said voltage source is applied to said motor in the positive and negative directions, and a rotatable indicating element driven by said motor arranged to indicate the integrated sum of said input currents.

10. In combination, a pair of saturable cores, an oscillator coupled to said cores, a plurality of input circuits coupled to said cores, output and feedback windings coupled on said cores, said cores being operable to produce an alternating signal on said output windings proportional to the algebraic sum of a plurality of direct currents flowing in said input circuits, means coupled to said output windings for detecting said alternating signal to produce a differential direct voltage having a magnitude and polarity proportional to the algebraic sum of said input currents, a direct current motor, a source of direct voltage for said motor, means operative in response to said differential direct voltage for controlling the ratio of the times said voltage source is applied to said motor in the positive and negative directions, a rotatable indicating element driven by said motor arranged to indicate the integrated sum of said input currents, a direct current generator having a linear speed-voltage characteristic coupled to said motor and driven thereby, and means coupling the output of said generator to produce a negative feedback current in said feedback windings.

11. In combination, a pair of saturable cores, an oscillator coupled to said cores, a plurality of input circuits coupled to said cores, output and feedback windings coupled on said cores, said cores being operable to produce an alternating signal in said output windings proportional to the algebraic sum of a plurality of direct currents flowing in said input circuits, means coupled to said output windings for detecting said alternating signal to produce a differential direct voltage having a magnitude and polarity proportional to the algebraic sum of said input currents, a motor, a source of direct current voltage for said motor, means including a pair of relays for controlling the ratio of the times said voltage is applied to said motor in the positive and negative directions in response to said differential direct voltage, a rotatable indicating element driven by said motor arranged to indicate the integrated sum of said input currents, a direct current generator coupled to said motor and driven thereby, and means coupling the output of said generator to said feedback windings to produce a negative feedback current therein.

12. In combination, a pair of saturable cores each having a primary winding, a plurality of input windings, an output winding, and a feedback winding, corresponding windings on said cores being connected in series, an oscillator coupled to said primary windings, means for applying a plurality of direct input currents to said input windings, a phase-sensitive detector coupled to said output windings and operative to produce a differential direct voltage having polarity and magnitude proportional to the algebraic sum of said direct input currents, a differential direct voltage amplifier coupled to said detector, a direct current motor, means including a pair of relays energized by the output of said differential amplifier for periodically energizing said motor for controlling the speed and direction thereof, and a rotatable element coupled to said motor and driven thereby arranged to indicate the integrated sum of said input currents.

13. In combination, a pair of saturable cores each having a primary winding, a plurality of input windings, an output winding, and a feedback winding, corresponding windings on said cores being connected in series, an oscillator coupled to said primary windings, means for applying a plurality of direct input currents to said input windings, a phase-sensitive detector coupled to said output windings being operative to produce a differential direct voltage having polarity and magnitude proportional to the algebraic sum of said direct input currents, a differential direct voltage amplifier coupled to said detector, a direct current motor, means including a pair of relays energized by the output of said differential amplifier for periodically energizing said motor for controlling the speed and direction thereof, a rotatable element coupled to said motor and driven thereby arranged to indicate the integrated sum of said input currents, a direct current generator having a linear speed-voltage characteristic driven by said motor, and means connecting the terminals of said generator across said feedback windings for producing feedback current therein in a direction to produce a flux in said cores which opposes the net flux produced by said input currents.

14. In combination, a pair of saturable cores each having a primary winding, a plurality of input windings, an output winding, and a feedback winding, corresponding windings on said cores being connected in series, an oscillator coupled to said primary windings, means for applying a plurality of direct input currents to said input windings, a phase-sensitive detector coupled to said output windings and operative to produce a differential direct voltage having polarity and magnitude proportional to the algebraic sum of said direct input currents, a differential direct voltage amplifier coupled to said detector, a direct current motor, means including a pair of relays energized by the output of said differential amplifier for periodically energizing said motor for controlling the speed and direction thereof, a rotatable element coupled to said motor and driven thereby arranged to indicate the integrated sum of said input currents, a direct current generator having a linear speed-voltage characteristic driven by said motor, means connecting the terminals of said generator across said feedback windings for producing feedback current therein in a direction to produce a flux in said cores which opposes the net flux produced by said input currents, and means coupled to said saturable cores for adjusting the apparatus such that there is no rotation of said motor when the algebraic sum of said input currents is equal to zero.

15. In combination, a pair of saturable cores each having a primary winding, a plurality of input windings, an output winding, and a feedback winding, corresponding windings on said cores being connected in series, a fixed frequency oscillator coupled to said primary windings, means for applying a plurality of direct input currents to said input windings, a phase-sensitive detector coupled to said output windings and modulated by a second harmonic from said oscillator being operative to produce a differential direct voltage having polarity and magnitude proportional to the algebraic sum of said direct input currents, a differential direct voltage amplifier coupled to said detector, a direct current motor, a source of direct current voltage for said motor, means including a pair of relays for controlling the ratio of the times said voltage is applied to said motor in the positive and negative directions in response to the output of said differential amplifier, and a rotatable element coupled to said motor and driven thereby arranged to indicate the integrated sum of said input currents.

16. In combination, a pair of saturable cores each having a primary winding, a plurality of input windings, an output winding, and a feedback winding, corresponding windings on said cores being connected in series, a fixed frequency oscillator coupled to said primary windings, means for applying a plurality of direct input currents to said input windings, a phase-sensitive detector coupled to said output windings and modulated by a second harmonic from said oscillator being operative to produce a differential direct voltage having polarity and magnitude proportional to the algebraic sum of said direct input currents, a differential direct voltage amplifier coupled to said detector, a direct current motor, a source of direct current voltage for said motor, means including a pair of relays for controlling the ratio of the times said voltage is applied to said motor in the positive and negative directions in response to the output of said differential amplifier, a rotatable element coupled to said motor and driven thereby arranged to indicate the integrated sum of said input currents, a direct current generator driven by said motor, and means coupling the output of said generator to said feedback windings for producing a negative feedback current therein.

17. In combination, a pair of saturable cores each having a primary winding, a plurality of input windings, an output winding, and a feedback winding, corresponding windings on said cores being connected in series, a fixed frequency oscillator coupled to said primary windings, means for applying a plurality of direct input currents to said input windings, a phase-sensitive detector coupled to said output windings and modulated by a second harmonic from said oscillator being operative to produce a differential direct voltage having polarity and magnitude proportional to the algebraic sum of said direct input currents, a differential direct voltage amplifier coupled to said detector, a direct current motor, a source of direct current voltage for said motor, means including a pair of relays for controlling the ratio of the times said voltage is applied to said motor in the positive and negative directions in response to the output of said differential amplifier, a rotatable element coupled to said motor and driven thereby arranged to indicate the integrated sum of said input currents, a direct current generator driven by said motor, means coupling the output of said generator to said feedback windings for producing a negative feedback current therein, and means coupled to said saturable cores for adjusting the apparatus such that there is no rotation of said motor when the algebraic sum of said input currents is equal to zero.

18. Electrical apparatus comprising, in combination, a magnetic amplifier including a saturable transformer energized at a fundamental frequency, means coupling a plurality of direct current input signals to said amplifier, said amplifier being operable to produce a second harmonic signal proportional in amplitude to the algebraic sum of said plurality of input direct currents, means for detecting said second harmonic signal to produce a direct current output voltage proportional to the algebraic sum of said plurality of input direct currents, a rotatable indicating element and means responsive to said output voltage for driving said rotatable element at a speed proportional to said output voltage.

19. In combination, a magnetic amplifier including a saturable transformer energized at a fundamental frequency, means coupling a plurality of direct current input signals to said transformer, said amplifier being operable to produce a second harmonic signal proportional in amplitude to the algebraic sum of said plurality of input direct currents, means for detecting said second harmonic signal to produce a direct current output voltage proportional to the algebraic sum of said plurality of input direct currents, a rotatable indicating element, means responsive to said output voltage for driving said rotatable element at a speed proportional to said output voltage, means driven by said last-mentioned means for generating a direct voltage proportional to the speed of rotation of said rotatable element, and means coupling the output of said generating means to said saturable transformer as a feedback signal.

20. In combination, a transformer including a pair of saturable cores each having a plurality of input windings and a feedback winding, corresponding windings on said cores being connected in series, means for energizing said transformer at a fundamental frequency, means for applying a plurality of direct input currents to said input windings, said transformer being operable to produce a second harmonic signal proportional in amplitude to the algebraic sum of said plurality of input currents, means for detecting said harmonic signal and producing a direct output voltage proportional to the algebraic sum of said direct input currents, a rotatable indicating element, and reversible means responsive to said output voltage for driving said rotatable element at a speed proportional to said output voltage.

21. In combination, a transformer including a pair of saturable cores each having a plurality of input windings and a feedback winding, corresponding windings on said cores being connected in series, means for energizing said transformer at a fundamental frequency, means for applying a plurality of direct input currents to said input windings, said transformer being operable to produce a second harmonic signal proportional in amplitude to the algebraic sum of said plurality of input currents, means for detecting said second harmonic signal and producing a direct output voltage having magnitude and polarity dependent on the algebraic sum of said direct input currents, a rotatable indicating element, reversible means responsive to said output voltage for driving said rotatable element, means driven by said last-mentioned means for generating a direct current voltage having magnitude and polarity dependent on the rate and direction of rotation of said rotatable element, and means coupling the output of said generating means to said feedback windings.

22. In combination, a magnetic amplifier including a saturable core having means for coupling thereto an alternating signal and a plurality of direct current input signals and having output and feedback windings, means connected to said output windings for producing a direct current output voltage having magnitude and polarity dependent on the algebraic sum of said input signals, a rotatable indicating element, a reversible motor mechanically connected to said rotatable element and responsive to said output voltage for rotating said element, means driven by said motor for generating a direct voltage proportional to the rate and direction of rotation of said motor, and means coupling the output of said generator to said feedback windings.

23. Apparatus for adding a plurality of direct currents comprising, a pair of saturable cores each having a primary winding, a plurality of input windings, an output winding and a feedback winding, corresponding windings on said cores being connected in series, means for applying an alternating current which partially saturates said cores to said primary windings, means for applying a plurality of direct input currents to said input windings, means coupled to said output windings and responsive to the signal induced therein for generating a direct current voltage proportional to the algebraic sum of said input currents, and means coupling the output of said generating means to said feedback windings for producing a feedback current therein in a direction to produce a flux in said cores which opposes the net flux produced by said input currents.

JOHN W. TRISCHKA.
HENRI S. SACK.

References Cited in the file of this patent

UNITED STATES PATENTS

| Number | Name | Date |
| --- | --- | --- |
| 768,934 | Duncan | Aug. 30, 1904 |
| 2,338,423 | Geyer | Jan. 4, 1944 |
| 2,388,070 | Middel | Oct. 30, 1945 |
| 2,510,384 | Dehmel | June 6, 1950 |